United States Patent [19]
Wallace

[11] Patent Number: 5,145,300
[45] Date of Patent: Sep. 8, 1992

[54] DEFORMABLE LOCKING FASTENER AND METHOD OF USE

[75] Inventor: John Wallace, Huntington Beach, Calif.

[73] Assignee: Air Industries, Inc., Garden Grove, Calif.

[21] Appl. No.: 481,373

[22] Filed: Feb. 15, 1990

[51] Int. Cl.$^5$ .............................................. F16B 31/00
[52] U.S. Cl. ...................................... 411/1; 411/278; 411/336; 411/937.2
[58] Field of Search ................. 411/3, 1, 8, 336, 334, 411/335, 281, 360, 361, 277, 7, 10, 2, 276, 278, 937.2

[56] References Cited

U.S. PATENT DOCUMENTS

| | | |
|---|---|---|
| 930,450 | 8/1909 | Zinow . |
| 1,603,618 | 10/1926 | McClellan . |
| 1,892,119 | 12/1932 | Thompson . |
| 2,713,882 | 7/1955 | Wilkes . |
| 3,034,611 | 5/1962 | Zenic . |
| 3,311,147 | 3/1967 | Walker . |
| 3,434,379 | 3/1969 | Wing . |
| 3,449,998 | 6/1969 | Wing . |
| 3,464,306 | 9/1969 | Reynolds et al. . |
| 3,603,132 | 9/1971 | Holmes . |
| 3,750,732 | 8/1973 | Moebius . |
| 3,763,725 | 10/1973 | Reiland . |
| 3,792,933 | 2/1974 | Stencel . |
| 3,920,338 | 11/1975 | Dahl . |
| 3,930,428 | 1/1976 | Hale . |
| 4,260,005 | 4/1981 | Stencel . |
| 4,291,737 | 9/1981 | McMurray et al. . |
| 4,383,353 | 5/1983 | Stencel . |
| 4,408,936 | 10/1983 | Williamson . |
| 4,544,312 | 10/1985 | Stencel . |
| 4,601,623 | 7/1986 | Wallace . |
| 4,682,520 | 7/1987 | Gray . |
| 4,735,537 | 4/1988 | Rath . |
| 4,768,910 | 9/1988 | Rath . |
| 4,806,054 | 2/1989 | Rath . |
| 4,815,907 | 3/1989 | Williamson et al. . |
| 4,842,466 | 6/1989 | Wheeler et al. . |
| 4,877,363 | 10/1989 | Williamson et al. . |

FOREIGN PATENT DOCUMENTS

| | | |
|---|---|---|
| 222771 | 9/1958 | Australia . |
| 6602955 | 6/1968 | Fed. Rep. of Germany . |
| 1675031 | 12/1970 | Fed. Rep. of Germany . |
| 1750585 | 2/1971 | Fed. Rep. of Germany . |
| 895237 | 5/1962 | United Kingdom . |
| 922333 | 3/1963 | United Kingdom . |
| 985714 | 3/1965 | United Kingdom . |

Primary Examiner—Rodney M. Lindsey
Attorney, Agent, or Firm—Knobbe, Martens, Olson & Bear

[57] ABSTRACT

An improved deformable locking fastener system comprises a bolt, a deformable collar and an installation tool. The bolt has a threaded exterior for engaging the collar. The collar has an axial bore threaded to engage the bolt. The exterior of the collar is defined by a central portion and a head portion. The central and head portions preferably have an elliptical shape with the central portion slightly greater in size. The central portion and the head portion are deformed from their elliptical shapes to substantially round shapes to securely fasten the collar and bolt. The central portion advantageously generates a predetermined preloaded tension between the collar and the nut. The head portion locks the collar and bolt together because it is swaged or deformed into recesses on the threads of the bolt. A tool is used to secure the collar on the bolt. The tool comprises a cylindrical socket wrench having a central axial bore which defines a recess on one end for attachment to a socket driver and an a stepped elliptical cavity on the opposite end for engaging the central and head portions of the collar.

13 Claims, 4 Drawing Sheets

DEFORMABLE LOCKING FASTENER AND METHOD OF USE

BACKGROUND OF THE INVENTION

The present invention relates generally to fastening systems, and in particular to locking fastener systems and tools that swage or deform a collar to lock it into a fastener.

Various systems for locking threaded fasteners have been developed. Some locking fasteners rely on swaging material from a nut or collar into recesses on a bolt or shear pin. Such a system is disclosed in U.S. Pat. No. 4,601,623 issued to Wallace. The locking fastener of Wallace includes a shear pin or bolt with exterior threading to engage the axial bore of a nut or collar. The nut has a base and an elliptical end portion.

The Wallace system also has an installation tool with an elliptical bore adapted to engage the end portion of the nut. Engaging the nut with the tool and rotating the tool applies torque to thread the nut onto the bolt. Once a predetermined load is reached, the nut is set and the tool rotates further thereby applying radial compression to deform the nut inward toward the bolt. The elliptical bore is larger than the elliptical end portion of the nut. Continued rotation deforms the ends of the elliptical end portion. The deformation of the end portion of the nut continues until the end portion has a generally circular shape and the tool rotates freely on the nut. Deformation of the nut causes it to extend into recesses in the bolt, thereby locking the nut to the bolt.

Another locking fastener system is disclosed in U.S. Pat. No. 4,383,353 issued to Stencel. The locking fastener of Stencel comprises a collar with an interior bore threaded for engagement with a pin. On its exterior, the collar has three lobes that extend radially outward from the collar for engagement with an installation tool. The collar is threaded onto the pin, and at a predetermined load the lobes on the collar deform radially inward to lock the collar and the pin together. The installation tool rotates freely on the collar once the lobes have been deformed.

One drawback to the fastener systems described above and others known in the art is that the preload and locking forces are generated simultaneously. The preload is the tension between the fastener and the collar which places the intervening joint into compression. The locking occurs with the deformation of the collar into the fastener. Since the preload force and locking force are generated at the same time, a portion of the applied torque is used to lock the collar and pin together, and the remaining torque is use to create a preload between the collar and pin. As the lock is formed, it resists increases in the preload. As the lock is formed, less load is available to increase and maintain the preload. Thus, the fasteners known in the art require the application of additional torque to generate the desired preload and overcome the resistance of the lock being formed.

In blind fastener applications, allen wrenches are often inserted into a mating cavity on the bolt to hold the bolt when threading on the collar. These wrenches lock the bolt in a fixed position to prevent the bolt from turning at the same rate as the collar. Because of the force needed to deform the collars to form the lock, the tools known in the art often require a large amount of torque to secure locking fasteners. This large torque must be resisted at least in part by the allen wrenches, which sometimes causes the wrenches to break.

The large amount of torque also gives the installation tool an increased tendency to "cam off" or to be forced away from the nut during fastening. The end portion of the nut resists being deformed and forces the installation tool away from the free end of the nut. This causes the installation tool to become disengaged from the nut and slip as the nut is being tightened.

Typically, the deformable fasteners of the type described above are intended to deform at a predetermined torque which corresponds to a specified preload in the fastener. However, the simultaneous generation of the preload and lock interferes with the accurate setting of the preload and creates variations in the preload between the pin and collar when the fastener is completely installed. Since some of the installation torque is used to lock the fastener together, it is difficult to accurately predict the amount of torque that will be used to generate the preload, and thus, to repeatably predict the amount of preload between the pin and collar.

While the preload and lock may be separated as disclosed in U.S. Pat. No. 4,408,936 to Williamson, the devices and methods know in the art for separating the preload and lock operations make the mass production of such fasteners economically impractical. For example, Williamson discloses a fastener with a collar having a nut section, a drive section, and a shear section. The shear section connects the drive section and the nut section, and fractures when sufficient torque is applied to the drive section. Part of the nut section swages inward, and the drive section torques off. The cost of manufacturing such fasteners is expensive in part because such fastener systems have structural configurations that are difficult to manufacture. Additionally, the fastener of Williamson produces undesired scrap pieces that must be disposed.

As a result there is need for a fastening system and installation tool that generates the preload substantially independent from the lock, allows greater repeatability in the setting of the preload, and reduces the amount of torque required to secure the fastener.

SUMMARY OF THE INVENTION

The present invention is a fastening system that generates the preload substantially independent of the lock. The fastening system comprises an installation tool, a collar and a fastener, such as a bolt. The bolt has a threaded exterior portion. On the threaded portion of the bolt there are a series of recess to receive the collar when it is deformed inward.

The collar has a threaded axial bore adapted to receive and threadably engage the bolt. The collar has a cylindrical head portion, a cylindrical central portion larger than the head portion, and a base. The head and central portions are both deformable from an elliptical shape to a generally round shape. In the preferred embodiment, however, only the head portion is deformed into the recesses on the bolt. The head and central portions of the collar are adapted for engagement with the installation tool. The larger elliptical central portion is driven by the installation tool and generates the preload. The head portion is also driven by the installation tool, but forms the lock after the central portion begins to deform. The present invention advantageously generates the preload substantially before the lock by providing the central portion with a larger elliptical shape than the head portion, such that the central portion begins to deform at a higher load than is needed to deform the lock portion.

The installation tool is preferably a socket having complementary shaped cavities for engaging the collar. In a preferred embodiment, the tool is adapted to engage the stepped elliptical collar. The tool has an axial bore that defines a larger elliptical cavity and a smaller elliptical cavity to engage the central and head portions of the collar respectively. The axial bore also defines a recess for attaching the tool to a driver. Finally, the axial bore defines a central portion sized to receive the threaded portion of the bolt when the collar is installed.

The present invention also includes a method of installing a collar on a bolt using the tool and fastener of the present invention. In use, the tool is placed in engagement with the collar. The tool is then rotated to thread the collar on the bolt until resistance to threading increases. The tool applies the torque for generating the preload primarily by driving the larger central portion of the collar. Once the predetermined torque is applied, the central portion deforms, followed by deformation of the head portion of the collar. The torque applied to the head portion causes deformation to lock the collar and bolt together. The tool deforms the head portion of the collar inward to the bolt as the tool moves around the collar. The collar is swaged or deformed inward until the central and head portions of the collar have a substantially circular shape. However, the fastener has recesses which are positioned to coincide with the head portion so the head portion deforms into the recesses to lock the collar to the fastener. Preferably, the recesses do not coincide with the central portion so the lock is formed only at the head portion.

Broadly defined, the deformable collar comprises a first portion having at least one radially extending deformable projection which is designed to deform at a first predetermined torque, and a second portion connected to the first portion, the second portion having at least one radially extending deformable projection which is designed to deform at a second predetermined torque, the first deformable torque being different than the second deformable torque. Advantageously, the deformable projections on the first and second portions comprise a plurality of projections, symmetrically spaced about the periphery of each of the first and second portions, and with the first torque being greater than the second torque.

Still more preferably, the first and second portions have a substantially elliptical cross section in a plane substantially perpendicular to the longitudinal axis of the collar, with the projections extending for a distance along an axis substantially parallel to the longitudinal axis. Again, it is preferable that the axes of the ellipses be substantially aligned.

An important part of the collar of this invention is that the length and diameters of one of the elliptical portions is sized relative to the other portion so that the elliptical periphery of one portion deforms at a load which substantially determines the preload the collar exerts on an engaged fastener, with the other portion deforming at a lower load to lock the collar to the engaged fastener.

In a more detailed manner, the collar of this invention has a threaded bore for engagement with the threaded portion of the fastener. The collar comprises a head portion the exterior of which is substantially elliptical in shape, the exterior of the head portion being sized to be deformable radially inward to lock the collar to the fastener by deforming into the recesses in the fastener. The collar further comprises a central portion the exterior of which is substantially elliptical in shape, the central portion being sized larger than the head portion to deform at a higher load than that required to deform the head portion, which higher load provides a predetermined preload between said collar and said fastener, with the major axes of the ellipses of the head portion and the central portion being substantially aligned.

In a further variation of the above embodiments, the major diameter of the second or head portion is about equal to the minor diameter of the second or central portion. In a further variation of the above embodiments, the ratio of the major diameter of the second or head portion to the minor diameter of the first or central portion is between 1.0 and 1.2, with the ration preferably being about 1.0.

In a still further variation of the above embodiments, the first or central portion has a length of at least the longitudinal length of two threads in the bore of the collar. In other variations, the ratio of the minor diameter to the major diameter of the elliptical portions is about 0.88, for both the second or head portion and the first or central portion.

This invention also comprises a tool for installing the collars. Broadly defined, the tool comprises a housing having an engaging end, and a first recess in the housing having at least one radially extending cavity which is designed to engage with a corresponding projection on said collar to deform that projection at a first predetermined torque, with the first recess opening onto the engaging end of the housing. The housing further has a second recess opening onto the first recess, with the second recess having at least one radially extending cavity which is designed to engage a corresponding projection on the collar to deform that projection at a second predetermined torque which is different than the first torque.

Advantageously, to conform to the collar configuration, the housing may have a plurality of cavities, symmetrically spaced about the periphery of each of the first and second recesses, with the first torque being greater than the second torque.

If the collar uses elliptical deforming portions, then the tool will also have corresponding recesses which are elliptical. For example, the tool may comprise a housing with a longitudinal axis and an engaging end. The housing further comprises a first recess with an elliptical shaped cross section which extends into the housing for a first length, with the first recess opening onto an engaging end of the housing. The housing also has a second recess with an elliptical shaped cross section which extends into the housing for a second length. The second recess opens onto the first recess. The axes of the recesses are substantially aligned, but the second recess is smaller than the first elliptical recess.

Advantageously, the housing has a socket end configured to engage an installation socket wrench. Alternately, the housing may have a wrenching surface on the periphery of the housing configured to engage an installation wrench.

To accommodate an installation key, the housing may further comprise a third recess communicating with the second recess along the longitudinal axis of the housing. The third recess opens onto the end of the tool opposite the engaging end, and is sized to allow the passage of the key to engage an aperture in the collar to prevent the collar from rotating during installation.

In variations of the tool, the recesses have shapes corresponding to the shapes of the deformable portions of the collar. Thus the same general dimensional data applies, such as the major diameter of the second recess being about equal to the minor diameter of the first recess; the ratio of the major diameter of the second recess to the minor diameter of the first recess being between 1.0 and 1.2, and preferably being about 1.0; and the ratio of the minor diameter to the major diameter of the first and second recesses being about 0.88, for both recesses.

This invention also comprises a method of installing the deformable collars on fasteners with the tool. Such installation steps would include configuring the collar to have a first and a second deformable area with one deformable area deforming at a torque greater than the other deformable area; configuring the tool to have a first and a second recess corresponding in shape to, but being slightly larger than, the first and second deformable areas respectively; engaging at least one of the first and second deformable areas with the corresponding first and second recess of the tool; rotating the tool to rotate the collar to create a preload between the collar and the bolt; rotating the same tool to deform the deformable area having the greatest deformable torque, the deformable torque being selected to provide a desired preload in the bolt; and rotating the same tool to deform the remaining deformable area to deform the collar to lock the collar to the bolt.

Further variations on the method to accommodate the variations on the collar and tool design discussed above are also envisioned. Such variations, broadly phrased, would include configuring the first and second deformable areas of the collar and the first and second recesses of the tool to have an elliptical shaped cross section in a plane substantially perpendicular to a longitudinal axis of the collar. A still further variation would include inserting a key through an aperture in the tool to engage a recess in the bolt to hold the bolt from rotating during installation. Other variations include the dimensional variations discussed above.

It is an object of present invention to provide a fastener system that generates a higher preload for a given applied torque.

It is a further object of the present invention to separate the preload and lock functions and generate the preload substantially before the lock.

It is a further object of the invention to generate the preload substantially independently of the lock.

It is still a further object of the present invention to provide a fastening system that substantially separates the preload and lock functions, and is simple and inexpensive to manufacture.

It is yet another object of the present invention to provide a fastening system that provides improved repeatability of the preload.

These and other objects of the invention will become more apparent by reference to the drawings and detailed description.

DESCRIPTION OF THE PREFERRED EMBODIMENTS

Figure 1:
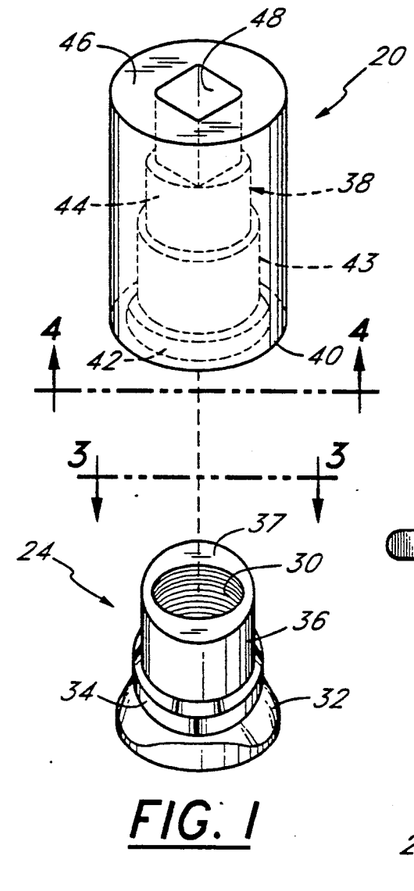
FIG. 1 is a perspective view of the preferred embodiment of the collar and installation tool of the present invention.
Figure 2:
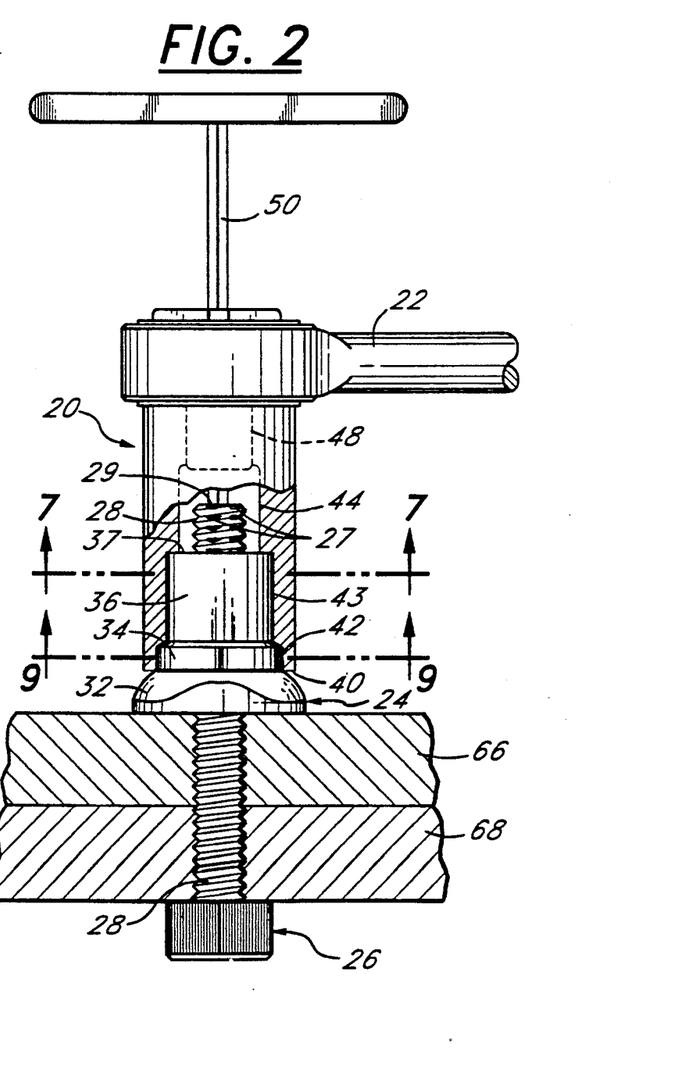
FIG. 2 is a partial cross-sectional view showing the locking fastener and installation tool of FIG. 1 used with a socket driver and key.

As shown in FIGS. 1 and 2, the present invention is a locking fastener system used to attach materials together. In a preferred embodiment the system of the present invention comprises a threaded fastener, such as a bolt or pin 26, a deformable collar or nut 24, and an installation tool 20. As shown in FIG. 2, the installation tool 20 is designed for attachment to an installation wrench such as a socket driver 22. The socket driver 22 is used to rotate the installation tool 20 and thread the locking collar 24 onto the bolt 26.

As shown in FIG. 2, the bolt 26 has an exterior threaded portion 28 for engaging the collar 24. The bolt may have a variety of lengths and diameters according to the application for the bolt 26, and the collar 24 used with the bolt 26. In an exemplary embodiment, the bolt 26 ranges in diameter from 0.179" to 0.395". Near the end of the threaded portion 28 of the bolt 26, there are at least one, and preferably a plurality, of recesses 27. The recesses 27 are shown as comprising cavities in each thread of the bolt 26. Larger recesses 27 extending across several threads may also be used. These recesses 27 provide an area into which the collar 24 may be partially swaged or deformed to lock the collar 24 and bolt 26 together.

The bolt 26 has an axial cavity 29 in its threaded end for engagingly receiving a wrenching key 50. The axial cavity 29 advantageously allows the collar 24 to be secured on the bolt 26 using a single end of the fastener. As illustrated in FIG. 2, the wrenching key 50 extends through the socket driver 22 along the same longitudinal axis as that of the bolt 26. The wrenching key 50 is adapted for a close fit inside the axial cavity 29 and is inserted into the axial cavity 29 to hold the bolt 26 stationary while the collar 24 is threaded onto the bolt 26.

Figure 6:
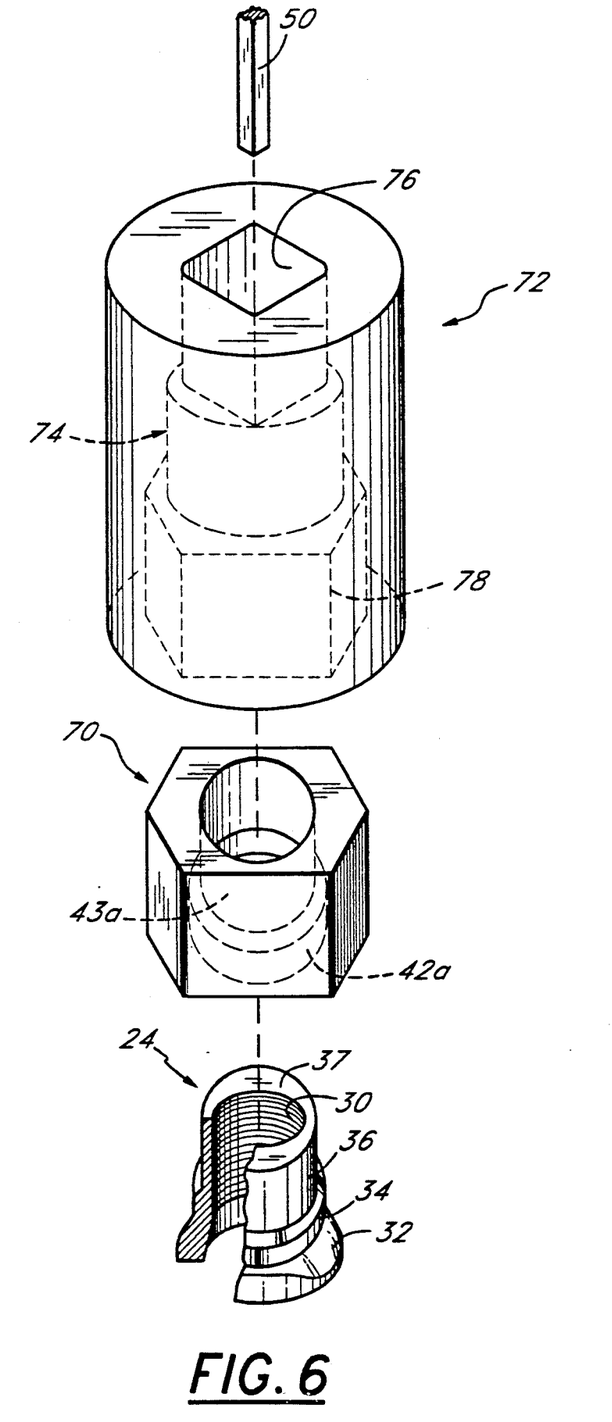
FIG. 6 is an exploded perspective view of an alternate embodiment of this invention.

Referring now to FIG. 1, the collar 24 has a circular base 32, a first deformable portion or central portion 34, and a second deformable portion or head portion 36. The collar 24 has a stepped configuration decreasing in size from the base 32 to the central portion 34 to the head portion 36. The base 32 has a circular shape and tapers inward to conform to the shape of the central portion 34. As shown in the sectional view of FIG. 6, the collar 24 also has a central axial bore 30 threaded to receive the threaded portion 28 of the bolt 26 (FIG. 2). The bore 30 (FIG. 6) has the same diameter through the interior of the head portion 36 and the central portion 34. The bore 30 gradually increases in diameter in the base 32 toward the bottom as best seen in FIG. 6. The collar 24 may be formed from a single piece of material, preferably metal, by processes known in the art.

Figure 3:
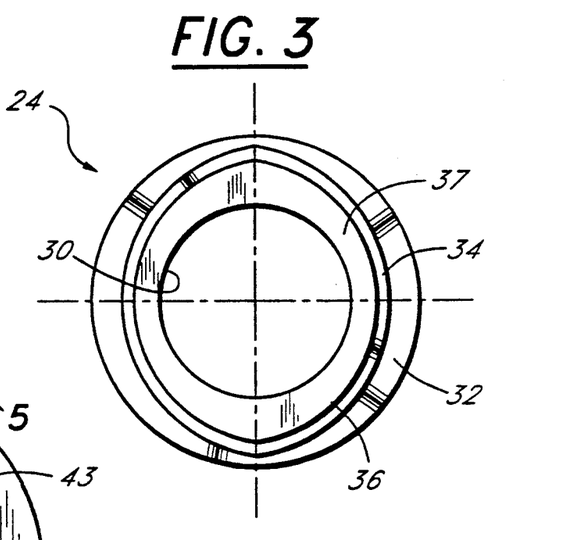
FIG. 3 is a top plan view of the collar of FIG. 1.

The central portion 34 connects the base 32 and head portion 36. The central portion 34 and head portion 36 are both deformable and provide wrenching portions to which torque may be applied. The central portion 34 and the head portion 36 both have an elliptical periphery with central portion 34 being larger than the head portion 36, as illustrated in FIGS. 1 and 3. The major and minor axes of the ellipses of the head portion 36 and the central portion 34 are coplanar. While the central and head portions 34, 36 are preferably elliptical in shape, it should be understood that the central and head portions 34, 36 may be any of a variety of deformable shapes where the central portion 34 is made larger than the head portion 36.

The dimensions of the central portion 34 with respect to the dimensions of the head portion 36 are designed so that the applied torque primarily drives the central portion 34 to generate the preload before torque is applied to deform the head portion 36 to form the lock. In the preferred embodiment, the ratio of the major diameter of the head portion 36 to the minor diameter of the central portion 34 ranges from about 1.0 to about 1.2, and is preferably a ratio of 1:0. The ratio of the minor diameter to the major diameter for both the central and head portions 34, 36 ranges from about 0.83 to 0.93, and is preferably 0.88. The preferred heights for the central portion 34 and the head portion 36 are also designed to generate the preload before the lock. The central portion 34 has an appropriate height sufficient to generate the desired preload. The head portion 36 has a height that will deform enough collar material into the bolt 26 to lock the collar 24 and bolt 26 together. The height of the head portion 36 is at least two threads and preferably more.

In an exemplary embodiment, the head portion 36 may have a height of 0.150", an external major diameter of 0.235" and an external minor diameter of 0.205". The central portion 34 may have a height of 0.075", a major diameter of 0.265" and a minor diameter of 0.235". The threaded bore 30 may have a diameter of approximately 0.183" interior the central portion 34 and the head portion 36 to obtain a preload of about 700 lbs. In another exemplary embodiment, a larger collar 24 has a head portion 36 with height of 0.210", an external major diameter of 0.540" and an external minor diameter of 0.475". The central portion 34 may have a height of 0.148", a major axis of 0.615" and a minor diameter of 0.540" to obtain a preload of about 3600 lbs. The diameter of the threaded bore 30 for this exemplary embodiment is about 0.400". Thus, it should be understood, that one skilled in the art could construct a collar 24 with the appropriate dimensions for the desired preload.

The collar 24 and bolt 26 may be advantageously made of light weight, high strength alloys such as aluminum and titanium. However, it should be understood that the collar 24 and bolt 26 could be constructed of other materials with the appropriate strength and deformability tailored to the particular application for the fastener.

Figure 4:
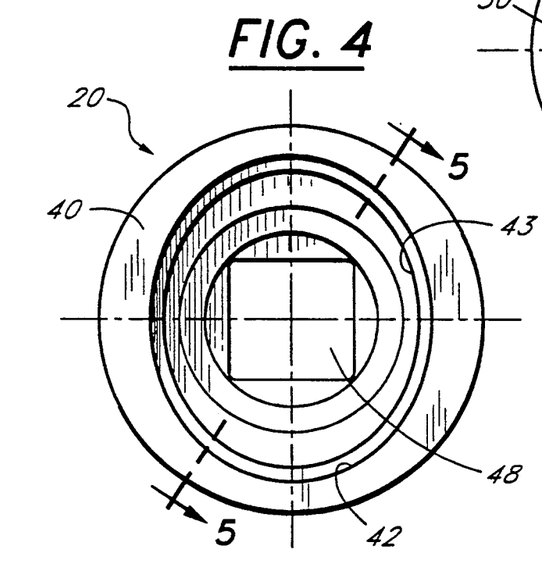
FIG. 4 is a bottom plan view of the installation tool shown in FIG. 1, as viewed from line 4—4 in FIG. 1.
Figure 5:
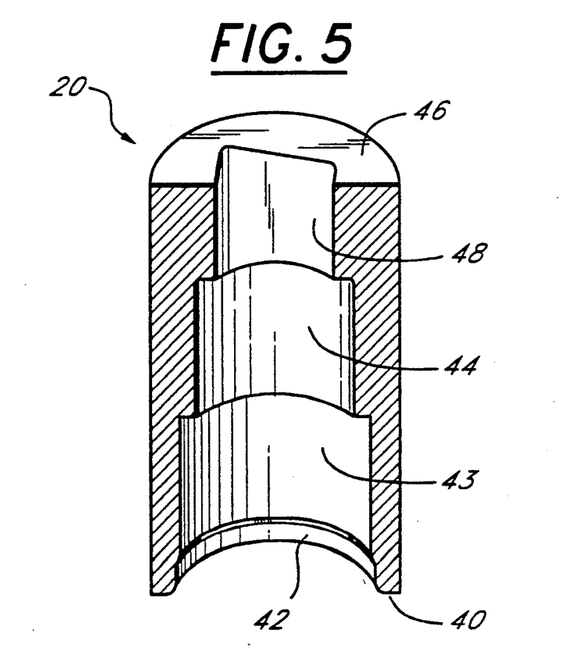
FIG. 5 is a cross-sectional view of the installation tool of FIG. 4, taken along line 5—5.

The collar 24 is fastened to the bolt 26 using the installation tool 20 of the present invention. In the preferred embodiment, the installation tool 20 has a generally cylindrical exterior shape with a stepped axial bore 38 therethrough as illustrated in FIGS. 1 and 5. The stepped axial bore 38 begins at an engaging end, or a bottom end 40 of the tool 20 and defines a larger first recess or cavity 42 and then a smaller second recess or cavity 43. The larger and smaller cavities 42, 43 are configured to fit closely and interface with the deformable portions 34, 36 of the collar 24. As is best seen in FIGS. 4 and 5, the larger cavity 42 has a shape complimentary to the central portion 36, preferably substantially elliptical in plan view. Above the larger cavity 42, the bore 38 narrows to form the smaller cavity 43. The smaller cavity 43 is also adapted to an elliptical shape for engaging the elliptical shaped head portion 36 of the collar 24. The cavities 42, 43 are slightly larger than the corresponding central and head portions 34, 36, in order to allow the tool 20 to fit over the collar 24.

A central portion 44 of the bore 38 advantageously provides space for the end of the threaded portion 28 of the bolt 26 to extend into the installation tool 20 when the collar 24 is being fastened on the bolt 26. From the central portion 44 to the top end 46 of the tool 20, the axial bore 38 defines a third recess 48. The recess 48 has a cross-section, shown as a square, sized and shaped for attachment to the conventional socket driver 22 (FIG. 2).

It should be understood that the installation tool 20 may be adapted to include an anti-cam off feature as disclosed in the patent application entitled "Improved Installation Tool For Locking Fasteners and Method of Use" filed with the United States Patent and Trademark Office on Feb. 12, 1989, which is herein incorporated by reference. Pockets or reliefs (not shown) may be carved into the wrenching portions of the tool 20 to reduce any cam off tendency. The wrenching portions are those areas on the wall forming the large and small cavity 42, 43 that contact and drive the collar 24. Collar mass is forced into these pockets during deformation. The collar mass holds the tool 20 in engagement with the collar 24 and reduces any tendency of the tool 20 to cam off. It should be noted that the pockets or reliefs need not be carved in both the large and small cavities 42, 43 and may be placed in either to effectively reduce cam off.

The installation tool 20 is preferably made of hardened steel or other suitable high strength metal alloys. The installation tool 20 must have the strength required to deform the collar 24. This requires that the large and small cavities 42, 43 in the tool 20 substantially retain their shape throughout the threading of the collar 24 onto the bolt 26 and throughout the deformation of central and head portions 34, 36.

While the preferred embodiment of the installation tool 20 is shown and described above as a single piece socket wrench, it should be understood that the installation tool 20 may take the form of an insert 70 for a standard socket 72 for a socket wrench as illustrated in FIG. 6. The socket wrench 72 has axial bore 74 extending therethrough. The axial bore 74 defines an opening 76 and a cavity 78 at opposite ends of the socket 72. The opening 76 is adapted for placement on a socket driver 22 (FIG. 2). The cavity 78 has a standard hexagonal shape for driving collars, nuts, etc.

The insert 70 has a wrenchable exterior adapted for engagement and placement inside the socket 72. The exterior is preferably hexagonal for a close fit with the cavity 78 of the socket 72. While the exterior of the insert 70 is preferably hexagonal, it should be understood that the exterior may take any shape that provides a close fit with the cavity 78 of the socket 72. The insert 70 additionally defines a larger cavity 42a and a smaller cavity 43a, identical to the larger and smaller cavities 42, 43 of FIGS. 1 and 5. These cavities 42a, 43a are adapted to engage and deform the central portion 34 and the head portion 36 of the collar 24 respectively.

Installation of a fastener system of the present invention will now be described with reference to FIGS. 2, and 7-10. As illustrated in FIG. 2, the fastener such as bolt 26 is inserted through work pieces 66 and 68 which are being fastened together. The collar 24 is placed on the threaded portion 28 of the bolt 26. The installation tool 20 is attached to the socket driver 22 and the tool 20 is positioned to engage the collar 24 to thread it on the bolt 26. In the engaged position, the head portion 36 and the central portion 34 of the collar 24 fit within the tool 20. Portions of the large and small cavities 42, 43 abut and contact the deformable portions 34, 36 of the collar 24, respectively. The installation tool 20 rotates when a torque is applied by the driver 22. Rotation of the tool 20 in turn applies a torque which causes the collar 24 to thread on the bolt 26. As the tool 20 is rotated, force is applied primarily to the central portion 34 because of its larger size. However, some force is applied to the head portion 36 by small cavity 43 that contacts the collar 24.

Figure 7:
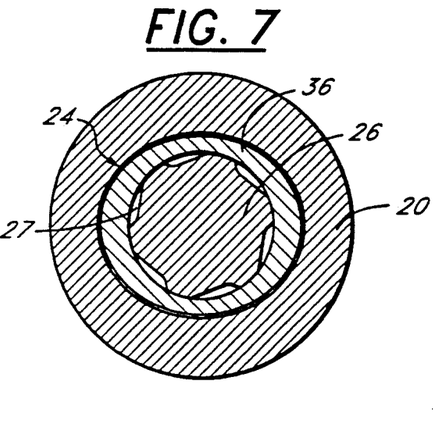
FIG. 7 is a cross-sectional view taken along line 7—7 of FIG. 2 showing the bolt and collar in threaded engagement before deformation.
Figure 9:
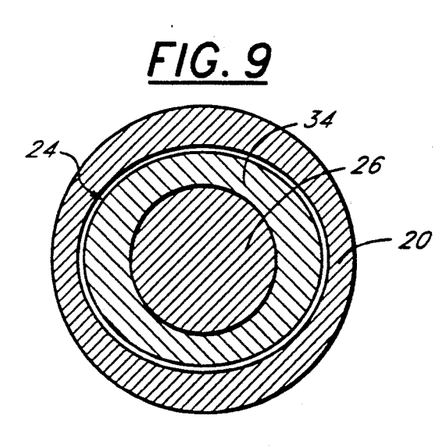
FIG. 9 is a cross-sectional view taken along line 9—9 of FIG. 2 showing the bolt and collar in threaded engagement before deformation.
Figure 10:
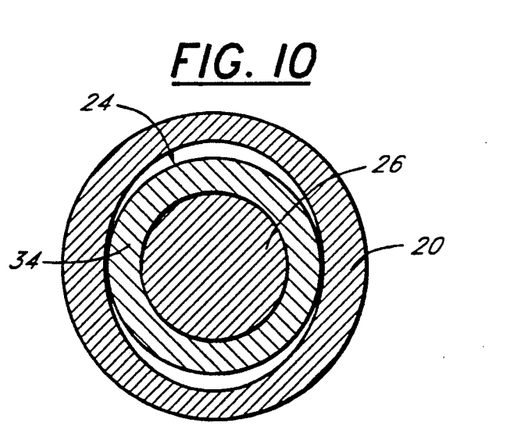
FIG. 10 is a cross-sectional view taken along line 9—9 of FIG. 2 showing the bolt and collar in threaded engagement after deformation.

Initially, the resistance to rotation is minimal and the tool 20 and collar 24 rotate at the same rate. At this point no deformation has occurred and the head portion 36 has a substantially elliptical exterior shape as illustrated in FIG. 7. The central portion 34 also has elliptical shape as shown in FIG. 9. Since the shapes of the central and head portions 34, 36 are unmodified, they continue to engage the large and small cavities 42, 43 respectively, to apply torque to the collar 24.

As the collar 24 is tightened onto the bolt 26 the resistance to threading increases. When the resistance to threading reaches a specified level, the appropriate preload has been generated and the installation tool 20 will begin to deform the collar 24 into the recesses 27 on the bolt 26. Advantageously, the initial deformation of the collar 24 begins with the deformation of the central portion 34 and does not result in the collar 24 and bolt 26 being locked together since no area is provided to deform the central portion 34 inward to the bolt 26. Preferably, the recesses 27 only extend over on the thread portion 28 of the bolt 26 interior the head portion 36 of the collar 24. Thus, the appropriate preloaded tension on the bolt 26 is generated before the collar 24 and bolt 26 are locked together. This ensures that the proper amount of torque, as indicated by deformation of the central portion 34 of the collar 24, is generated while permitting further rotation of the collar 24 after deformation has begun.

Figure 8:
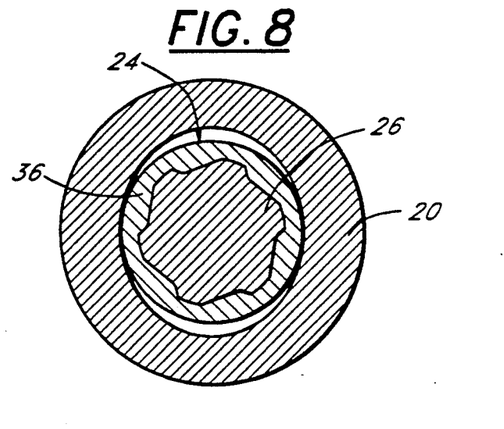
FIG. 8 is a cross-sectional view taken along line 7—7 of FIG. 2 showing the bolt and collar in threaded engagement after deformation.

Once the central portion 34 begins to deform, the torque primarily drives the head portion 36 to swage the collar 24 into the recesses 27 on the bolt 26. As the tool 20 is rotated around the collar 24, the head portion 36 of the collar 24 will be deformed radially inwardly from its elliptical, out-of-round shape to a circular shape which prevents the application of further torque. As illustrated in FIG. 7, the head portion 36 of the collar 24 has an out-of-round shape allowing the torque to be applied the collar 24 before it is deformed. However, as shown in FIG. 8, after deformation the diameter of the head portion 36 of the collar 24 is equal to or less than the minor axis of the cavity 43 of the installation tool 20 and thus allows free rotation of the tool 20 on the collar 24.

The present invention advantageously separates a substantial portion of the generation of the preload from the formation of the lock, by using the central portion 34 to generate the preload and the head portion 36 to form the lock. The central portion 34 of the collar 24 is sized relative to the head portion 36. The central portion 34 is a predetermined amount larger than head portion 36 to advantageously create a greater moment arm which requires less applied torque to achieve a predetermined preload between the collar 24 and the bolt 26. Once the appropriate preload is reached by applying a torque to the central portion 34, the central portion 34 begins to deform from an elliptical exterior shape to a substantially circular shape. The bore 30 interior to the central portion 34 deforms inward toward an area of the threaded portion 28 of the bolt 26 that does not have recesses 27. Without recesses 27 on the bolt 26, there is no area for the collar mass to be deformed into for locking the bolt 25 and collar 24 together.

The cavities 42, 43 (FIGS. 1 and 5) of the installation tool 20 are adapted for a close fit with the collar 24. Nonetheless, there is a gap 82 between the central portion 34 and the large cavity 42 of the tool 20 as best illustrated in FIGS. 7 and 9. In an exemplary embodiment, the gap 82 between the central portion 34 and the large cavity 42 is approximately 0.002" about the periphery of the central portion 34 while the gap about the periphery of the head portion 36 is about 0.001". As the central portion 34 is deformed by the tool 20, the collar material is deformed from an elliptical shape into the gap 82 to give the central portion 34 a shape less than round and to increase the pressure of the central portion 34 on the threaded portion 28 of the bolt 26. Thus, the deformation of the central portion 34 is not primarily relied upon for locking.

In contrast, the head portion 36 of the collar 24 is primarily for locking the collar 24 and bolt 26 together. The head portion 36 is designed to be swaged or deformed into the recesses 27 on the threaded portion 28 of the bolt 26. The head portion 36 is designed to have an elliptical shape a predetermined amount smaller than the central portion 34 of the collar 24. This advantageously allows the preload to be generated before and independent of the locking deformation. As explained above, once the central portion 34 begins to deform there will be minimal locking effect since the bolt 26 provides no areas for radial compression of the central portion 34 inward. Thus, once the central portion 34 begins to deform, the preload has been reached and set, and the torque will be applied primarily to the head portion 36 of the collar 24 to form a lock. This is in part due to size difference between the central portion 34 and the head portion 36. When the torque is applied to the head portion 36, the radial compression will cause the head portion 36 to be deformed from its elliptical shape into a circular shape with the additional collar mass being swaged into the recessed on the bolt 26 as illustrated in FIG. 8.

Since the preload and lock functions are separated and correlated to the respective dimensions of the central portion 34 and the head portion 36, the preload that will result can be established with greater repeatability than with the present invention. Unlike prior art deformable collars that combine the preload and locking deformation, the preload for the fastener of the present invention is generated substantially from the torque applied to the central portion 34, and the locking is generated from the smaller torque subsequently applied to the head portion 36. With the present invention it is much easier to predict the resulting preload because the preload will be determined by the torque applied to the central portion 34, and thus, the size of the central portion 34. Therefore, it should be understood that one skilled in the art could determine similar dimensions for the respective sizes of the central portion 34 and the head portion 36 of the collar 24 depending on the preload desired, and the materials involved.

It is believed advantageous to design the locking portion relative to the preload portion along certain dimensional guidelines. Similarly, it is believed advantageous to design the recesses in the tool along certain dimensional guidelines as the recesses correspond to the collar configuration. For the elliptical shaped deformation areas, the deformable areas are configured so that the ratio of the major diameter of the smaller deforming portion to the minor diameter of the larger deforming portion is between 1.0 and 1.2, with the ratio preferably being about 1.0. The corresponding ratios for the recesses are that the ratio of the major diameter of the smaller recess to the minor diameter of the larger recess is between 1.0 and 1.2, with the ratio preferably being about 1.0.

Similarly, the major diameter of the second or head portion is advantageously about equal to the minor diameter of the second or central portion. Likewise, the first or central portion advantageously has a length of at least the longitudinal length of two threads in the bore of the collar. Preferably, the length corresponds to the longitudinal length corresponding to four threads in the bore of the collar. Still further, the ratio of the minor diameter to the major diameter of the elliptical portions is between about 0.83 and about 0.93, and preferably about 0.88, for both the second or head portion and the first or central portion. The recesses or cavities in the tool have corresponding ratios as they engage the deformable portions of the collar.

Having described the invention in connection with certain preferred embodiments thereof, it will be understood that many modifications and variations thereto are possible, all of which fall within the true spirit and scope of this invention. Thus, while the preferred embodiment of the invention has been described as having elliptical deformable areas and elliptical recesses, other configurations are possible which could separate the locking from the preload. Along these lines, other deformable fasteners in the art could be modified to use the similar deformation design, but duplicate it on the same collar and tool so one set of projections deforms at a higher load than a second set of projections, with the higher strength projections determining the preload, and the lower strength projections locking the collar to the fastener.

Thus, broadly speaking, the deformable collar could comprise a first portion having at least one radially extending deformable projection which is designed to deform at a first predetermined torque, and a second portion connected to the first portion, the second portion having at least one radially extending deformable projection which is designed to deform at a second predetermined torque, the first deformable torque being different than the second deformable torque. Advantageously, the deformable projections on the first and second portions comprise a plurality of projections, symmetrically spaced about the periphery of each of the first and second portions, and with the first torque being greater than the second torque.

If the first and second portions have a substantially elliptical cross section in a plane substantially perpendicular to the longitudinal axis of the collar, with the projections extending for a distance along an axis substantially parallel to the longitudinal axis, then the relationship between the more broadly defined configuration and the preferred embodiment is more readily seen.

What is claimed is:

1. A locking fastener system comprising:
    a fastener having a threaded portion with recesses in the threaded portion; and
    a collar having a threaded bore for engagement with the threaded portion of the fastener, the collar further comprising:
    a head portion the exterior of which is substantially elliptical in shape, the exterior of the head portion sized to be deformable radially inward to lock the collar to the fastener by deforming into the recesses in the fastener; and
    a central portion the exterior of which is substantially elliptical in shape, the central portion being sized larger than the head portion to deform at a higher load than that required to deform the head portion, which higher load provides a predetermined preload between said collar and said fastener, the major axes of the ellipses of the head portion and the central portion being substantially aligned.

2. A fastener system as defined in claim 1, wherein the major diameter of the head portion is about equal to the minor diameter of the central portion.

3. A fastener system as defined in claim 1, wherein the ratio of the major diameter of the head portion to the minor diameter of the central portion is between 1.0 and 1.2.

4. A fastener system as defined in claim 3, wherein the ratio is about 1.0.

5. A fastener system as defined in claim 3, wherein the head portion has a length of at least the longitudinal length of two threads in the bore.

6. A fastener system as defined in claim 1, wherein the ratio of the minor diameter to the major diameter of the elliptical exteriors is between about 0.83 and 0.93, for both the head portion and the central portion.

7. A fastener system as defined in claim 6, wherein the ratio is about 0.88, for both the head portion and the central portion.

8. A deformable collar for use with a fastener, the collar having a threaded central bore extending along at least a length of a longitudinal axis of the collar, comprising:
    a first portion having at least one radially extending deformable projection which is designed to deform at a first predetermined torque; and
    a second portion connected to the first portion, the second portion having at least one radially extending deformable projection which is designed to deform at a second predetermined torque, the first deformable torque being different than the second deformable torque.

9. A deformable collar as defined in claim 8, wherein said deformable projections on the first and second portions comprise a plurality of projections, symmetrically spaced about the periphery of each of the first and second portions, and wherein the first torque is greater than the second torque.

10. A deformable collar as defined in claim 8, wherein said first portion of the collar has a substantially elliptical cross section in a plane substantially perpendicular to the longitudinal axis of the collar, with the projections extending for a first length along an axis substantially parallel to the longitudinal axis, and wherein said second portion of the collar has a substantially elliptical cross section in the plane substantially perpendicular to the longitudinal axis of the collar, with the projections extending for a second length along an axis substantially parallel to the longitudinal axis, with the major axis of the ellipse of the first portion being greater than the major axis of the ellipse of the second portion.

11. A deformable collar as defined in claim 10, wherein the ratio of the major axis of the ellipse of the second portion to the minor axis of the ellipse of the first portion is between 1.0 and 1.2, and wherein the deformable projections on the first portion deform at a torque greater than the torque to deform the second portion.

12. A deformable collar as defined in claim 11, wherein the second length is at least a length corresponding to two threads of the central bore of the collar.

13. A deformable, collar for use with a fastener, comprising:
a first portion having an elliptical shaped periphery extending for a first length along a longitudinal axis; and
a second portion connected to the first portion and having an elliptical shaped periphery extending for a second length along said longitudinal axis, the major diameters of the elliptical shapes of the first and second portions being substantially aligned, the first and second portions having a threaded bore therethrough along said longitudinal axis with at least one end of the bore opening onto an exterior surface of the collar, the length and diameters of one of the portions being sized relative to the other portion so that the elliptical periphery of one portion deforms at a load which substantially determines the preload the collar exerts on an engaged fastener, with the other portion deforming at a lower load to lock the collar to the engaged fastener.

* * * * *